Patented Mar. 12, 1940

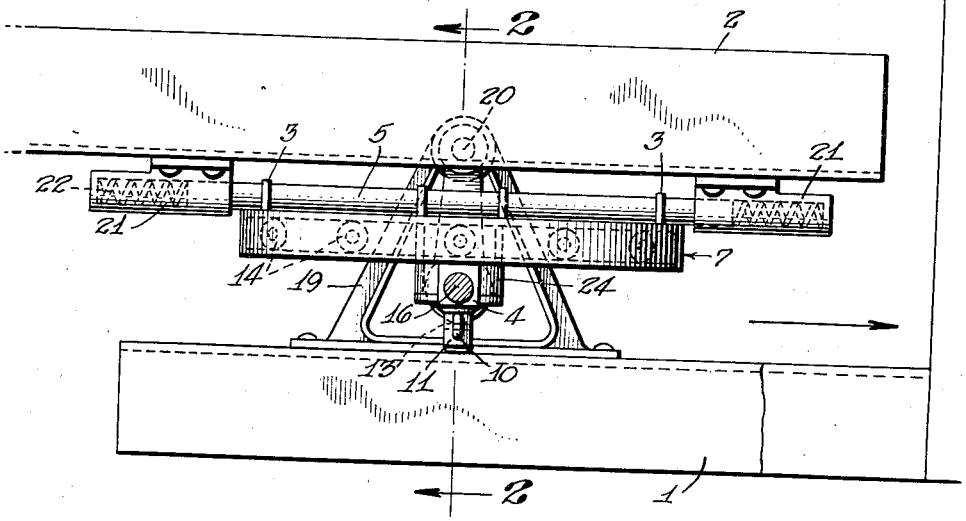

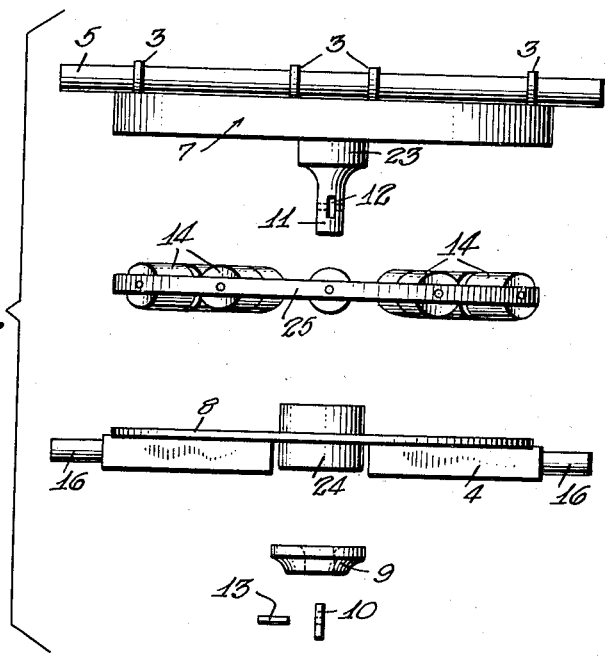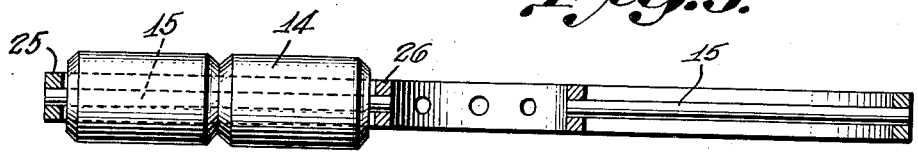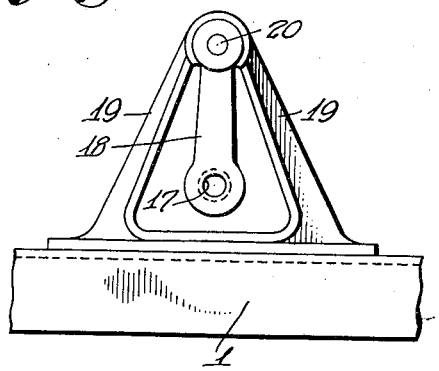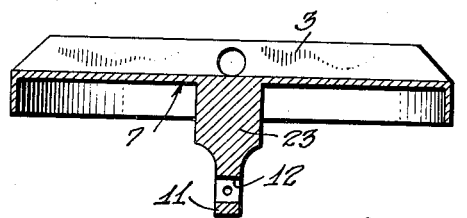

2,193,744

UNITED STATES PATENT OFFICE 2,193,744

FIFTH WHEEL

Everett Cline Shriver, Enid, Okla.

Application November 8, 1937, Serial No. 173,465

1 Claim. (Cl. 280—33.1)

The present invention relates to a fifth wheel construction adapted for use as a flexible connection between a truck and trailer, semi-trailer or other vehicle by which it is to be transported.

An object of the present invention is to provide a construction adapted to act as oscillation means for the truck and trailer in any direction.

A further object is to provide a fifth wheel construction which is not liable to be accidentally separated.

A still further object of the invention is to provide a fifth wheel construction involving the use of rollers and cushioning means.

A still further object of the invention is to provide a fifth wheel construction which is so constructed as to be protected from dust, moisture, etc.

Further and other objects will be apparent from the drawings and description in which:

Figure 1 is a sectional view of the invention taken on the line 1—1 of Figure 2, Figure 2 is a vertical sectional view taken on the line 2—2 of Figure 1, Figure 3 is an enlarged transverse sectional view taken through one of the spring retaining bearings, Figure 4 is an exploded view clearly illustrating the method of assembling the invention, Figure 5 is a sectional view of the roller bearings showing means for retaining same, Figure 6 is a sectional view of the upper member, and Figure 7 is a front elevational view of one of the cradle bearings.

Referring more particularly to the drawings, the numeral 1 indicates the main or chassis beams of a truck or other vehicle while 2 designates the conventional beam of a trailer or like vehicle.

Generally the invention comprises an upper shallow inverted cup shaped member 7, a lower plate member 4, and an intermediate arrangement of rollers 14 separating members 7 and 4. Integrally secured by brackets 3 to the upper surface of member 7 is a pivot shaft 5 for a purpose later to be described. As shown in the drawings the member 7 is provided with a hub 23 which terminates into a reduced portion 11. An opening 12 is provided in the reduced portion 11 for the reception of a wedge shaped key member 10 and a cross opening is provided in both members 10 and 11 for the reception of a pin 13.

The lower member 4 is formed to telescope into upper member 7 and is provided with a sleeve member 24 which projects centrally in an upward and downward direction from member 4 and this sleeve member 24 in turn fits over the hub 23 of member 7. The circular flat surface 8 of member 4 serves as a grease retainer for the device when assembled. A pivot shaft 16 is integrally formed on lower member 4 pivoting same transversely with relation to shaft 5 on upper member 7.

An intermediate arrangement of rollers 14 is provided for spacing members 7 and 4 apart and these rollers lie with the member 7 when in assembled relation. The rollers 14 are supported between rings 25 and 26 by means of rods 15 extending in a tangential direction from ring 26 and are suitably secured to the rings. This arrangement not only provides an equal spacing of the rollers but also serves as a grease retainer for the assembly.

The shaft 16 of lower member 4 is secured to truck beams 1 by means of cradle bearings more particularly shown in Figure 7.

These cradles are secured to each beam 1 in any suitable manner and comprise a T stand 19 carrying at its upper end swinging shackles 18 suitably secured by means of a bolt 20. An opening 17 at the lower portions of shackles 18 is provided for insertion of shaft 16. It is understood that these cradles are in duplicate for each end of the shaft 16 and, for this reason, a description of only one has been given.

The shaft 5 of upper member 7 is secured to the trailer beam 2 by means of duplicate bearings 21 having springs 22 therein for cushioning the shaft 5. A member 6 through which the shaft 5 passes is secured to beam 2 in any suitable manner.

In assembling the device, it is to be noted that upper member 7 is shallow for the reception of the intermediate member and the lower member 4. The lower member 4 having flat upper surface 8 is provided with the sleeve 24 over which the roller carrying ring 26 is fitted. The sleeve 24 in turn is fitted over hub 23 of upper member 7 and this permits the flat member 8 to lie within the shallow member. This not only allows grease to be retained between members 7 and 4 but also encloses the structure from rain, moisture or other weather hazards.

To secure the above organization against accidental displacement, a washer 9 is applied to hub part 11 and bears against sleeve 24. A wedge key 10 is then driven in opening 12 of hub 11, thus binding all of the members together. To further guard against accidental displacement, a cross pin 13 may be driven within the hub and wedge key. The separation or unhitching of the truck from the trailer is very expeditiously accomplished by driving out the wedge 10 and lifting one member from the other.

In use of the device when attached as previously described, it will be noted that bearings 22 containing springs 21 house the ends of upper shaft 5. In resting against springs 21 the shaft ends are cushioned from thrusts of the trailer on hills and particularly on the down grades. The shackles 18 swinging in an arc within the prescribed limits of T-stand 19 house the ends of lower shaft 16. This arrangement balances the pull in proportion to the load and checks the jar of sudden starting or stopping of the truck where transportation of fragile articles or fruit might be damaged.

The use of rollers in a connection of this character not only provides a substantially frictionless connection, but one which is capable of receiving lubrication. In this respect the rollers not only assist the rotatability of member 4 but have the same effect in connection with upper member 7, it being understood that member 4 is freely rotatable around hub 23 and hub 23 freely rotatable within sleeve 24 of member 4.

While the device is preferably constructed from steel it is understood that any other metal may be used or any other material suited for this purpose.

While the term "rollers" has been used throughout the specification, it is understood that any other type of bearing, such as ball bearings, may be used to provide the frictionless separation of the upper and lower members.

It is further understood that while a preferred form of the invention has been shown and described, various changes may be made without departing from the spirit of the claim appended hereto.

What I claim is:

In a fifth wheel construction, including interfitting upper and lower sections and anti-friction bearings mounted between said sections, means for attaching said upper section to a vehicle, comprising a shaft integral with said section and extending longitudinally of said vehicle, bearings carried by said vehicle and receiving the ends of said shaft, said bearings being closed at their ends and sides, compression springs in said bearings between the ends of said shaft and the closed ends of said cup, a shaft integral with the bottom of said lower section and extending at right angles to said first shaft, and longitudinally swinging means carried by said second vehicle, said means being connected to the ends of said second shaft.

EVERETT CLINE SHRIVER.